Patented Apr. 16, 1935

1,997,868

UNITED STATES PATENT OFFICE 1,997,868

DISPERSION AND METHOD OF MAKING SAME

Harold L. Levin, Rutherford, N. J., assignor, by mesne assignments, to The Patent and Licensing Corporation, New York, N. Y., a corporation of Massachusetts No Drawing. Application March 8, 1932, Serial No. 597,644

2 Claims. (Cl. 134—1)

This invention relates to aqueous dispersions of materials which are normally water immiscible such as asphalt, resins, pitch, wax, rubber and the like and is more particularly concerned with dispersions which are produced with the aid of an organo-sol, which becomes irreversible upon drying, as the dispersing agent.

It has been found that hydrophillic colloidal cellulose derivatives such as viscose (cellulose xanthate) are capable of producing emulsions of new and unusual types. Viscose is a hydrophillic colloid produced by treating cellulosic material such as cotton linters or wood pulp with caustic soda to form soda cellulose and then with carbon bisulphide to produce the cellulose xanthate. The xanthate should be freshly prepared for use since upon standing it loses its colloidal properties and hence its ability to act as a dispersing agent.

For the purpose of dispersing bituminous material such as asphalt, the viscose is made into an aqueous paste and the asphalt added to the paste and subjected to intense mechanical stirring. The asphalt may be added in the molten condition, heated to a temperature above its melting point and the paste should be heated to such temperature that upon the addition of the asphalt the resulting temperature is above the melting point of the asphalt but preferably below 212° F. Sufficient water should be present at all times to maintain the paste as the external or continuous phase. An emulsion will be produced in which asphalt is in the dispersed phase. If it is desired to disperse high melting point asphalt, it may be fluxed or dissolved in a suitable solvent, thereby enabling the dispersing operation to be carried out at lower temperatures than would otherwise be possible.

Rubber may be dispersed by plasticizing it in the usual manner as by the use of fluxes and/or a mechanical milling operation, and then kneading the plasticized rubber in the presence of the viscose paste. The rubber is gradually reduced to colloidal size while the viscose paste is continuously maintained as the external phase.

Instead of dispersing the rubber while the viscose paste is continuously maintained as the external phase, the viscose paste may be dispersed in the rubber on a standard milling machine so that the rubber is in the external phase, and water added gradually while the mixture is subjected to intense mechanical agitation, as for example in a kneading machine, until a change of phase occurs and the water becomes the continuous phase.

Dispersions of water immiscible substances may be prepared containing approximately one part of viscose to from one to fifteen parts of the dispersed material.

The dispersing action of the viscose in any of the above described operations may be intensified mechanically by adding to the viscose a small amount of attriting agent of comparatively low colloidality such as clay, whiting or the like.

Upon dehydration of the dispersions in which viscose is used as the dispersing medium, the viscose reverts to an insoluble condition thereby producing an irreversible film which is substantially unaffected by water.

The viscose can also be converted to the insoluble cellulosic form by treatment with mineral acids.

Dry viscose is oil resistant and imparts this characteristic to the dehydrated emulsion film.

I claim as my invention:

1. The method of producing emulsions of organic water thermoplastic immiscible substances such as asphalt, resins, pitch and rubber, which comprises dispersing said substances in an aqueous paste of viscose said viscose acting as an emulsifying agent and being present in quantities less than the dispersed material.

2. As a composition, an emulsion comprising an organic water immiscible substance in the dispersed phase, water in the continuous phase and viscose as the emulsifying agent, said emulsifying agent being present in quantities less than the dispersed material.

HAROLD L. LEVIN.